United States Patent
Su

(10) Patent No.: US 6,461,002 B1
(45) Date of Patent: Oct. 8, 2002

(54) PROJECTOR TILT ADJUST SYSTEM COMPRISING A LATCHING MECHANISM FOR A HEIGHT-ADJUSTING SYSTEM

(75) Inventor: Cheng-Min Su, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 09/683,067

(22) Filed: Nov. 14, 2001

(51) Int. Cl.[7] .................... G03B 21/22; G03B 21/00; F16M 11/24; F16M 1/00
(52) U.S. Cl. ................ 353/119; 353/70; 248/188.4; 248/650
(58) Field of Search .................. 353/119, 70, 122; 248/393, 157, 423, 188.2, 188.4, 188.7, 188.8, 677, 650

(56) References Cited

U.S. PATENT DOCUMENTS

| | | | |
|---|---|---|---|
| 5,913,783 A | * 6/1999 | Weener et al. | 52/127.2 |
| 6,131,871 A | * 10/2000 | Bernhardt et al. | 248/424 |
| 6,279,860 B1 | * 8/2001 | Swanger | 248/125.2 |
| 6,302,543 B1 | * 10/2001 | Arai et al. | 353/70 |

* cited by examiner

*Primary Examiner*—Russell Adams
*Assistant Examiner*—Melissa Koval
(74) *Attorney, Agent, or Firm*—Winston Hsu

(57) ABSTRACT

A latching mechanism includes an aperture surface through which a threaded rod may pass. Half of the surface of the aperture is smooth and fixed in place relative to a housing. The other half is threaded and formed from an internal module that is slidable within the housing. The internal module is biased by a spring towards the fixed portion of the aperture surface. Flaring tabs on either side of the internal module support the internal module within the housing to ensure that a minimum of contact is established between the housing and the internal module so as to present a smooth latching/unlatching action.

18 Claims, 8 Drawing Sheets

PROJECTOR TILT ADJUST SYSTEM COMPRISING A LATCHING MECHANISM FOR A HEIGHT-ADJUSTING SYSTEM

BACKGROUND OF INVENTION

1. Field of the Invention

The present invention relates to a height-adjusting system. In particular, the present invention discloses a height-adjusting system that permits rapid rough adjustments of the extension of a supporting leg, and which further permits fine adjustments to the extensional length of the supporting leg.

2. Description of the Prior Art

Please refer to FIG. 1. FIG. 1 illustrates a typical setup for a projector 10. The projector 10 rests on a flat surface 12, such as a table, and projects an image onto a screen 14. As the height of the screen 14 may vary with respect to the projector 10, a tilt adjust system 18 is provided on the projector 10 to adjust a projection angle θ of the projector 10, and hence the position of the image on the screen 14.

Please refer to FIG. 2 with respect to FIG. 1. FIG. 2 is a front view of the tilt adjust system 18 for the projector 10. The prior art tilt adjust system 18 typically consists of two legs 18L. Each leg 18L has a threaded support rod 18R, a foot 18F, and a correspondingly threaded bolt 18B. The support rod 18R screws into the bolt 18B. By turning the support rod 18R (for example, by way of the foot 18F), a relative distance d between the foot 18F and the bolt 18B may be changed, thereby changing the height of the front end of the projector 10 and hence the projection angle θ.

The prior art tilt adjust system 18 provides a simple and secure footing for the projector 10. However, actually changing the projection angle θ can be a somewhat tedious process for the user, as it can involve turning each of the support rods 18R a great number of times. To facilitate this task, the user may place the projector 10 onto its side, so that the feet 18F are not in contact with the surface 12, and hence easier to turn. All of this is inconvenient

SUMMARY OF THE INVENTION

It is therefore a primary objective of this invention to provide a height-adjusting system for a device, such as a projector, that is easy to use and to adjust, and which provides secure footing for the device.

Briefly, the preferred embodiment of the present invention discloses a latching mechanism for a height-adjusting system. The latching mechanism includes a first housing, an internal module slidably disposed within the first housing, and a second housing that locks onto the first housing. The first housing has a bottom surface with a central opening for accepting a height-adjusting rod, a brace mounted on the bottom surface adjacent to the central opening, first and second surfaces respectively disposed on first and second sides of the first housing, and a third surface disposed on a third side of the first housing. The brace has a bracing surface that is substantially aligned with an edge of the central opening, and the bracing surface is adapted to brace the height-adjusting rod. The internal module includes a central portion having a first opening with a contact surface, first and second tabs extending respectively from first and second sides of the central portion, and a third tab extending from a third side of the central portion. The first, second and third tabs are respectively disposed over the first, second and third surfaces. The brace is disposed within the first opening. The bracing surface of the brace faces towards the contact surface on the first opening. Mechanical interaction between the first and second tabs and the first and second surfaces prevents the central portion from contacting the bottom surface so as to provide a smoother latching/unlatching action. When the central portion is in a first position, the contact surface of the first opening presses the height-adjusting rod against the bracing surface to latch the height-adjusting rod into position. When the central portion is in a second position, the contact surface of the first opening is sufficiently spaced from the bracing surface to enable the height-adjusting rod to slide between the bracing surface and the contact surface. The third tab acts as a button that a user may press to move the internal module to the second position so as to unlatch the height-adjusting rod and so quickly change the tilt angle of the projector. Both the contact surface and the height-adjusting rod are threaded, which enables the contact surface to mechanically engage with, and hence latch onto, the height-adjusting rod. When latched into position, the height-adjusting rod may be turned to permit fine adjustments to height.

It is an advantage of the present invention that by pressing the third tab as a button, the user may quickly latch and unlatch the height-adjusting rod, and so quickly change the extensional height of the height-adjusting rod. This would correspond to quick, rough adjustments to the height of the device, such as the tilt of a projector. Changing the projection angle is thus made both easier and quicker. Additionally, the action of the latching device is made smooth by the first and second tabs, as the internal module contacts the housing primarily only at the first and second tabs. Finally, as noted above, fine adjustments to the height of the device are possible by turning the height-adjusting rod.

These and other objectives of the present invention will no doubt become obvious to those of ordinary skill in the art after reading the following detailed description of the preferred embodiment, which is illustrated in the various figures and drawings.

DETAILED DESCRIPTION

Figure 1:
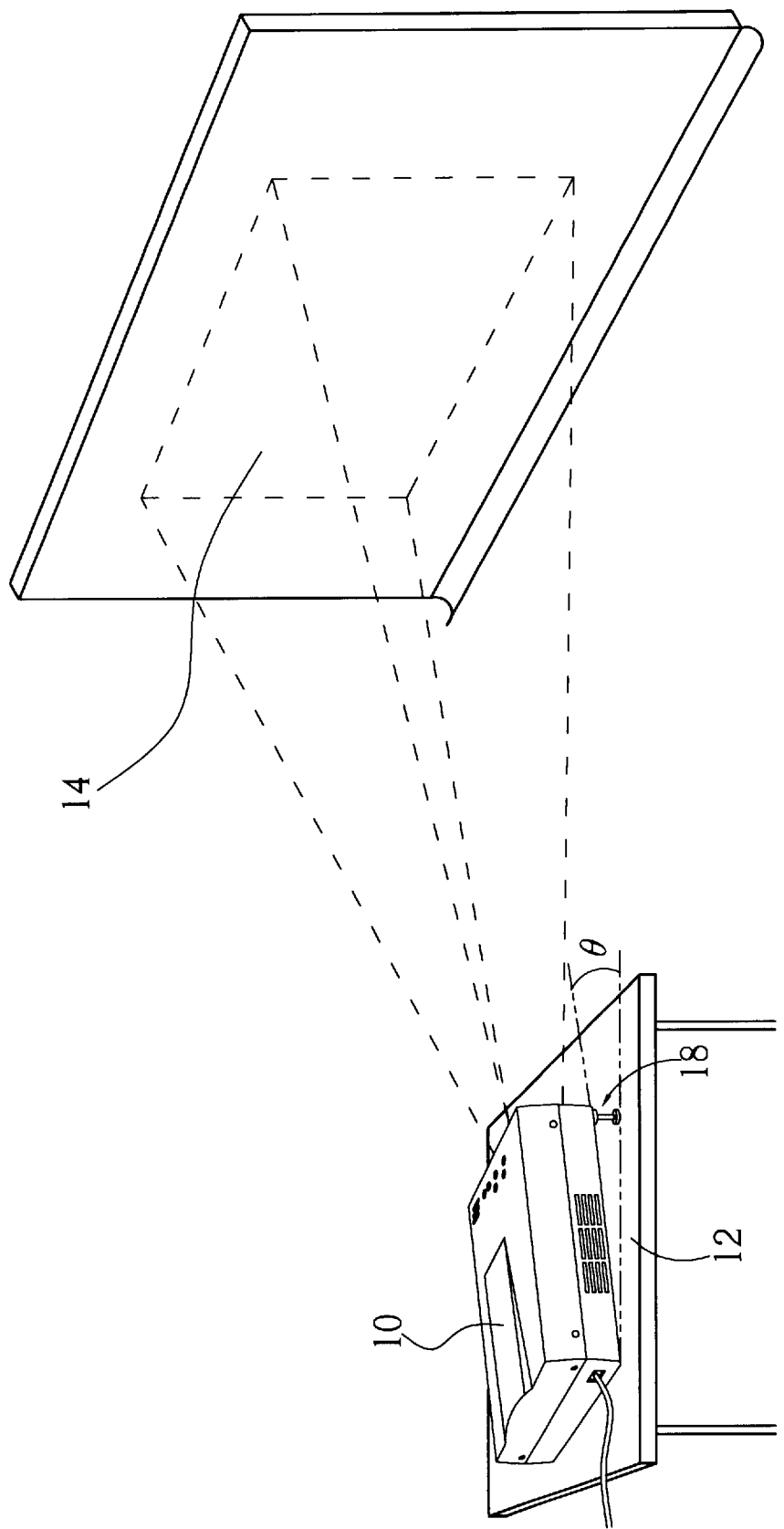
FIG. 1 is a perspective view of a typical set-up for a projector.
Figure 2:
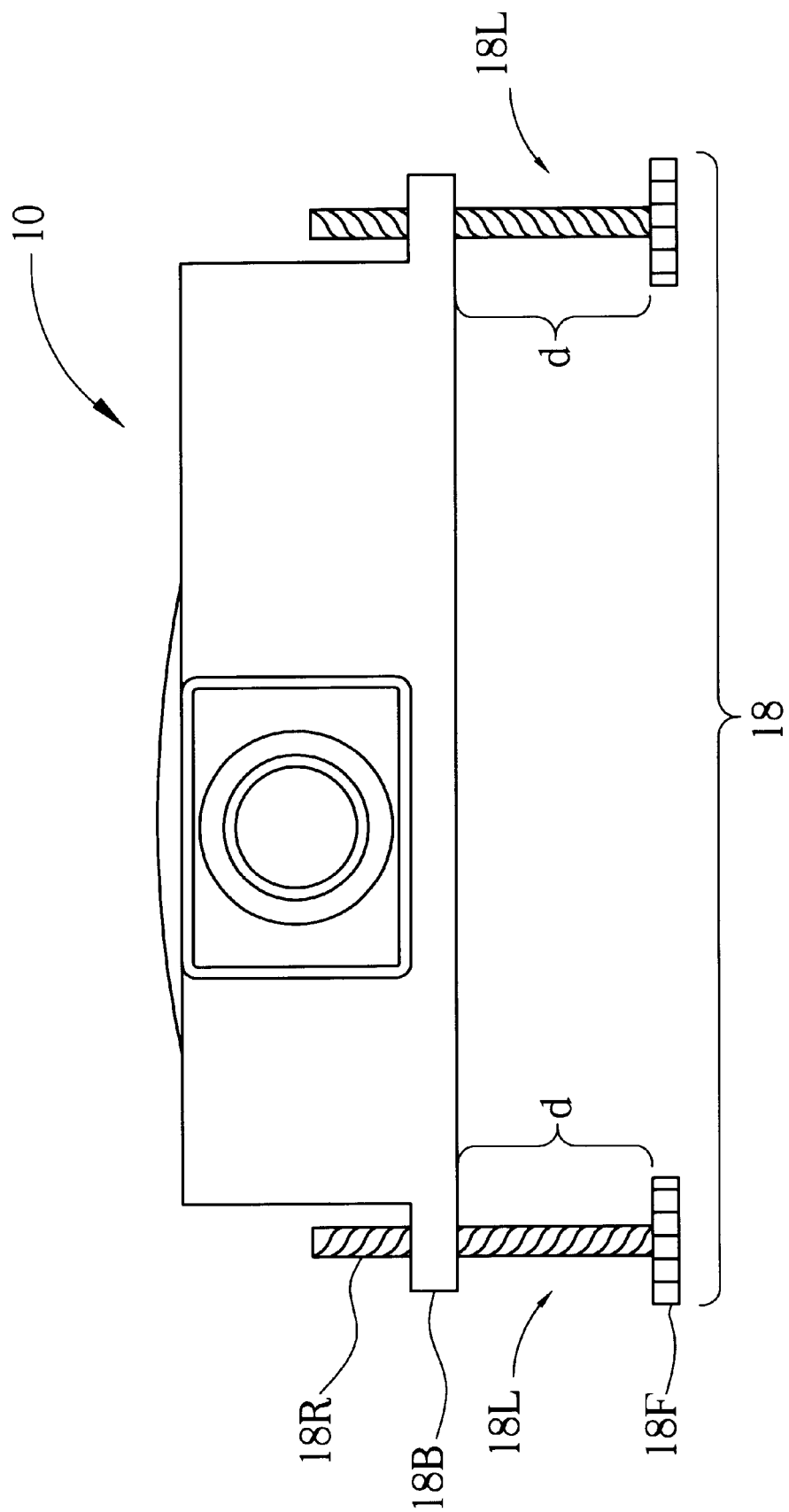
FIG. 2 is a front view of a projector shown in FIG. 1.
Figure 3:
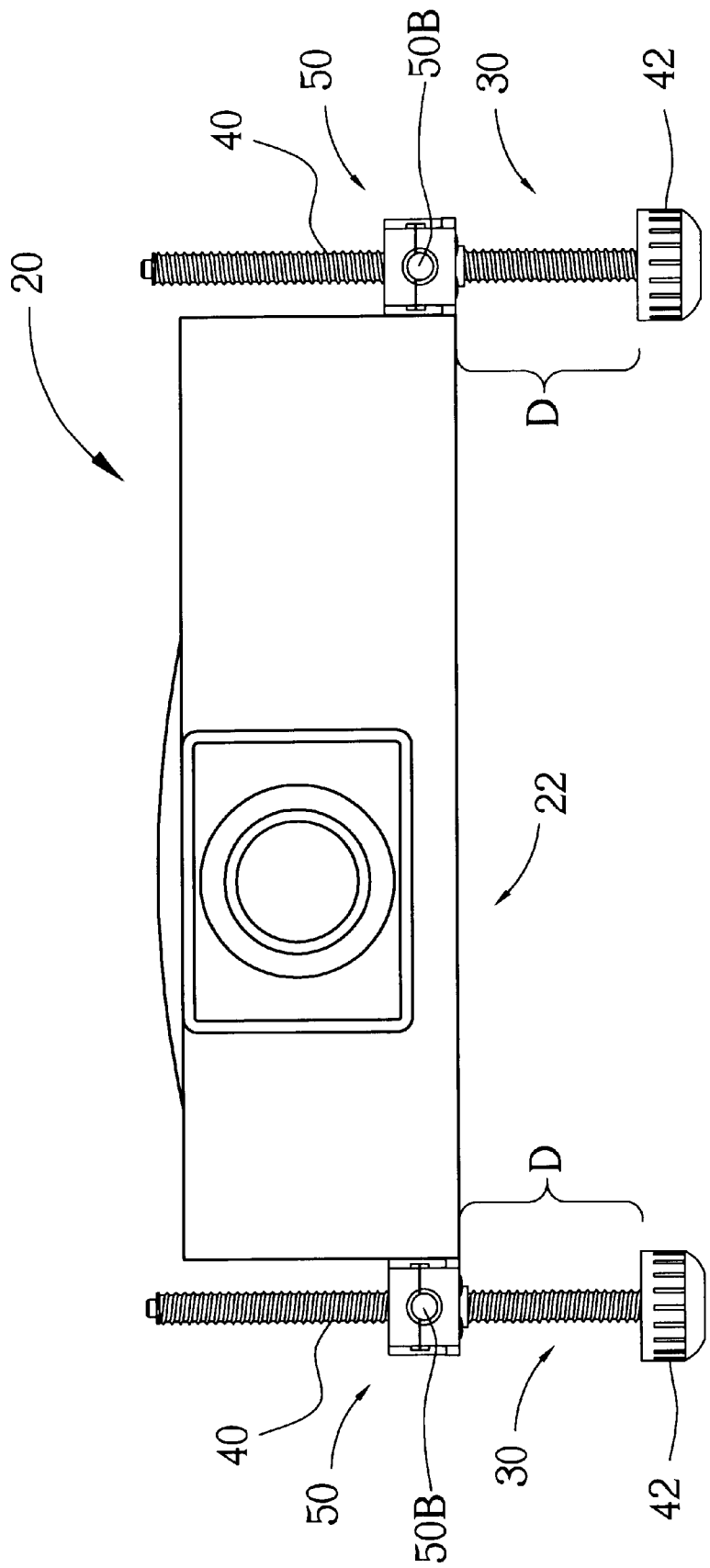
FIG. 3 is a front view of a projector utilizing a height-adjusting system according to the present invention.

Please refer to FIG. 3. FIG. 3 is a front view of a projector 20 utilizing height-adjusting systems 30 according to the present invention. Each height-adjusting system 30 includes a height-adjusting rod 40 and a latching mechanism 50. The height-adjusting rod 40 passes through the latching mechanism 50, and mechanical interaction between the height-adjusting rod 40 and the latching mechanism 50 keeps the height-adjusting rod 40 firmly secured into position with respect to the latching mechanism 50. However, when a button 50B on the latching mechanism 50 is depressed, the height-adjusting rod 40 mechanically disengages from the latching mechanism 50 and may slide freely through the latching mechanism 50. In this manner, a distance D between a foot 42 of the height-adjusting rod 40 and a bottom surface 22 of the projector 20 may be changed. The projection angle of the projector 20 is thereby adjusted. The foot 42 may have a relatively soft, gripping bottom surface (such as soft rubber) so as to prevent scratching to any surface upon which the foot 42 rests, as well as to prevent sliding of the projector 20.

Figure 4:
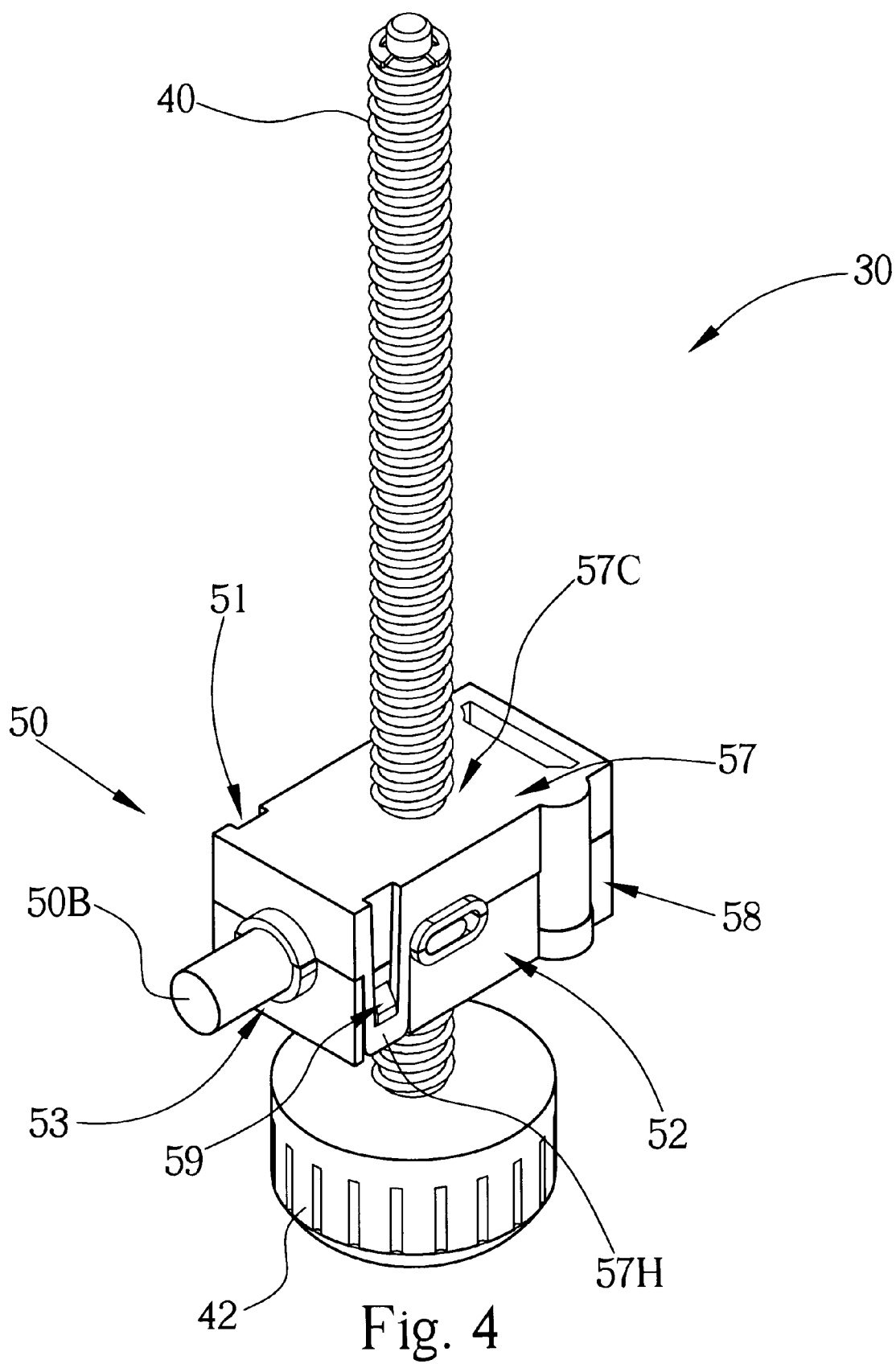
FIG. 4 is a perspective view of a present invention height-adjusting system.

Please refer to FIG. 4. FIG. 4 is a perspective view of the height-adjusting system 30. The latching mechanism 50 includes a second housing 57 locked onto a corresponding first housing 58 by way of a snap mechanism 59. Together, the corresponding shapes of the second housing 57 and the first housing 58 present a first opening 51 (not visible in FIG. 4), a second opening 52, and a third opening 53. The button 50B protrudes through the third opening 53.

Figure 5:
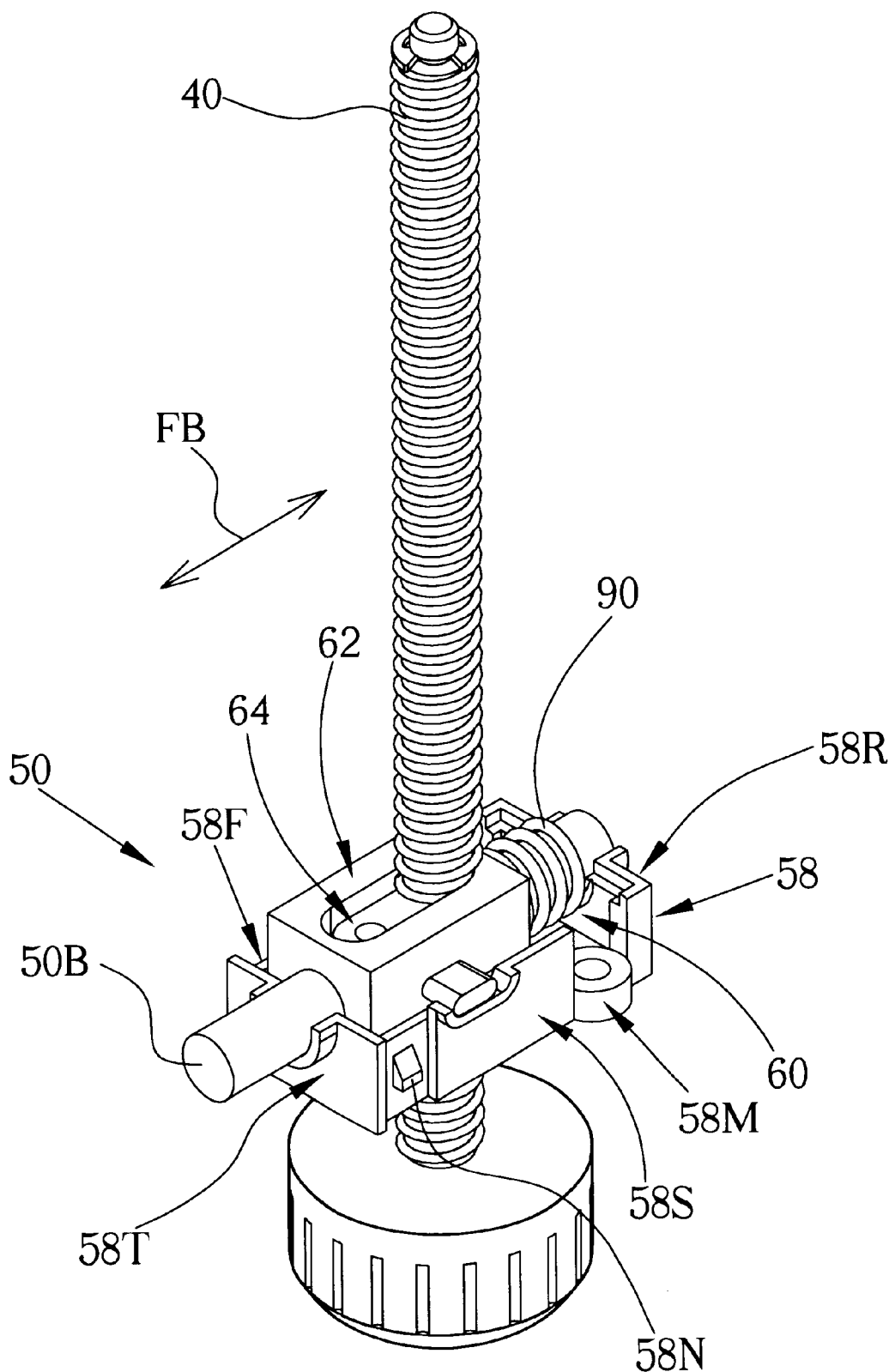
FIG. 5 is a perspective view showing internal structure of a height-adjusting system according to the present invention.

Please refer to FIG. 5 with respect to FIG. 4 and FIG. 3. FIG. 5 is a perspective view of the height-adjusting system 30 with the second housing 57 removed so as to enable viewing of the internal structure of the latching mechanism 50. The first housing 58 has a first side 58F, a second side 58S, a third side 58T and a fourth side 58R. An internal module 60 lies slidably disposed within the first housing 58. A central portion 62 of the internal module 60 has a first opening 64. The height-adjusting rod 40 passes through the first opening 64. The internal module 60 can slide in a forward and backward direction, as indicated by arrow FB, within the first housing 58. A spring 90, disposed between the fourth side 58R and the central portion 62 of the internal module 60, tends to push the internal module 60 towards the third side 58T. When pushed towards the third side 58T, mechanical interaction between the internal module 60 and the height-adjusting rod 40 secures the height-adjusting rod 40 into position. Pressing on the button 50B overcomes the mechanical biasing of the spring 90, and pushes the internal module 60 towards the fourth side 58R; doing so disengages the height-adjusting rod 40 from the internal module 60 so that the height-adjusting rod 40 may freely slide through the first opening 64. The first housing 58 has a notch 58N that engages with a corresponding hook 57H on the second housing 57 to enable the second housing 57 to lock onto the first housing 58. The first housing 58 also has a mounting fixture 58M that enables the latching mechanism 50 to be mounted onto a device, such as the projector 20.

Figure 6:
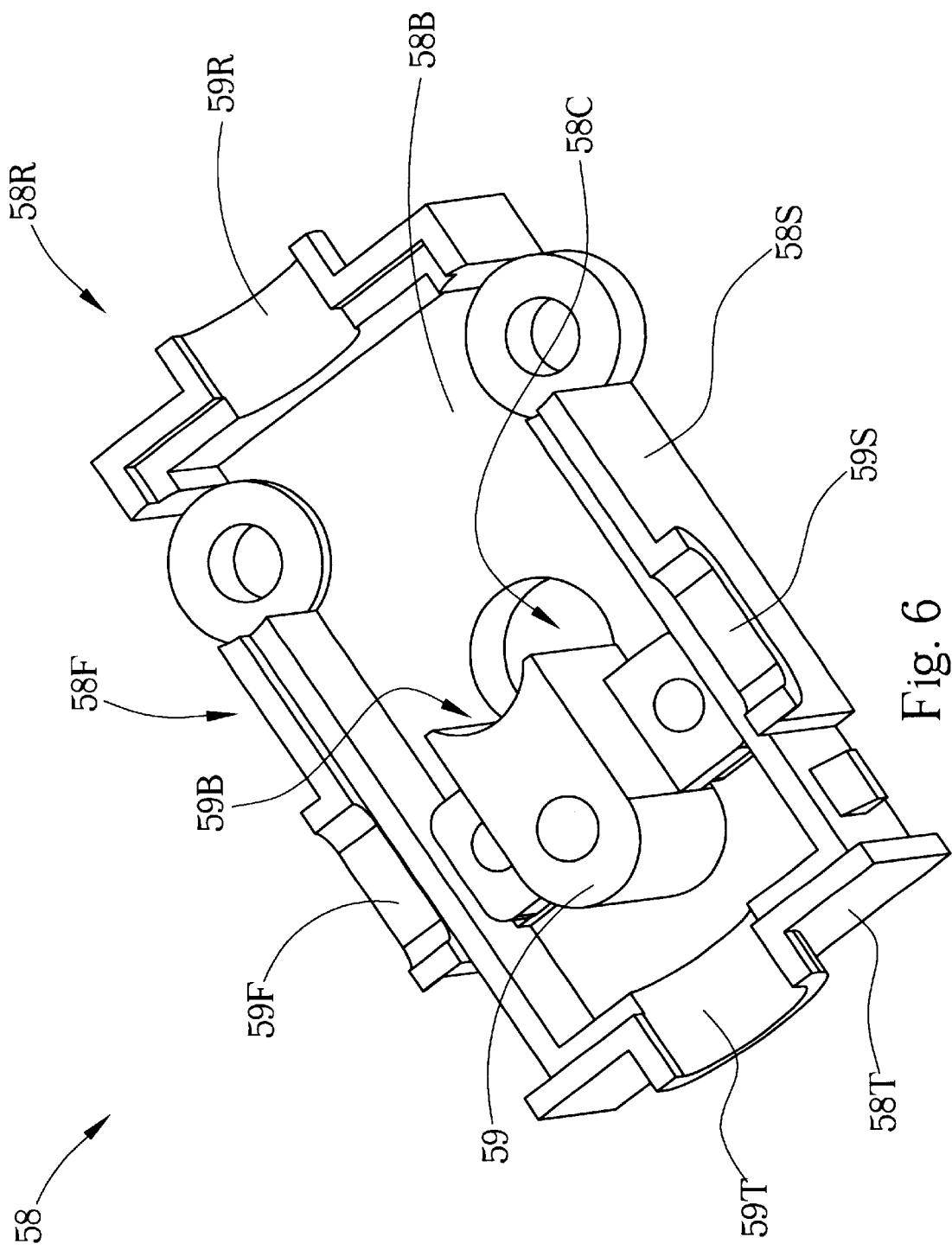
FIG. 6 is a top perspective view of a first housing of the present invention.

Please refer to FIG. 6 with reference to FIG. 4. FIG. 6 is a top perspective view of the first housing 58. The first housing 58 has a bottom surface 58B. The bottom surface 58B has a central opening 58C, through which the height-adjusting rod 40 passes. The central opening 58C should be just large enough to permit the height-adjusting rod 40 to pass freely through the central opening 58C. A brace 59 is mounted onto the bottom surface 58B adjacent to the central opening 58C. The brace 59 has a bracing surface 59B. The bracing surface 59B has a concave shape that substantially conforms to the surface shape of the height-adjusting rod 40, and which is aligned with the perimeter of the central opening 58C. When disposed through the central opening 58C, the height-adjusting rod 40 runs along the bracing surface 59B, contacting the bracing surface 59B. The bracing surface 59B presents a smooth surface for the height-adjusting rod 40, so that the height-adjusting rod 40 may slide easily against the bracing surface 59B. To present such a surface, the bracing surface 59B is ideally made from a hard, smooth plastic, such as the industrial-standard plastic nylon66. The first housing 58 has a first surface 59F on the first side 58F, and a similar second surface 59S on the second side 58S. The first and second surfaces 59F and 59S, together with conformal surfaces on the second housing 57, form the first and second openings 51 and 52. Similarly, a third surface 59T on the third side 58T combines with a conformal surface on the second housing 57 to form the third opening 53.

Figure 7:
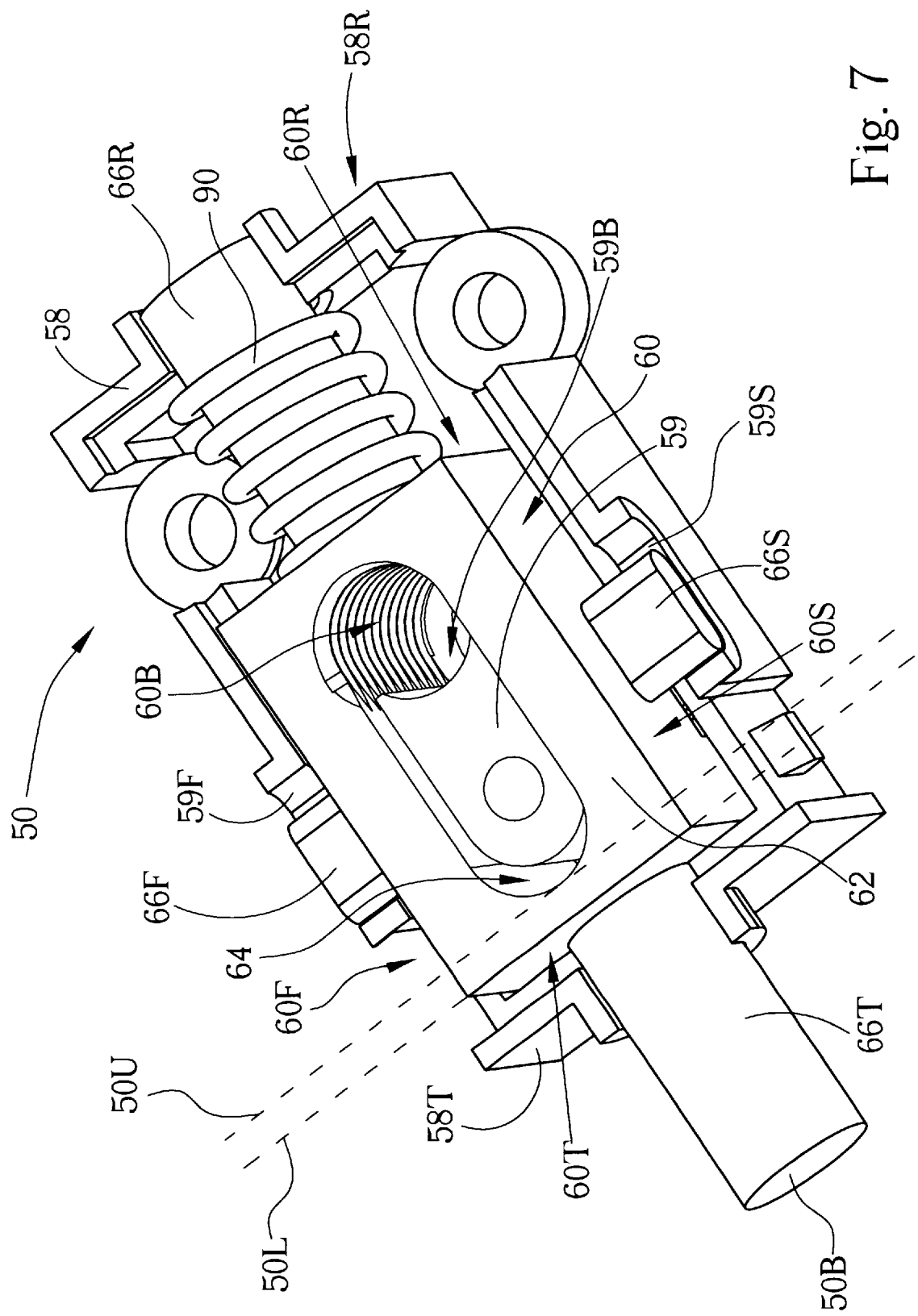
FIG. 7 is a top perspective view of the internal structure of a latching mechanism according to the present invention.

Please refer to FIG. 7 with respect to FIG. 6 through FIG. 3. FIG. 7 is a top perspective view of the internal structure of the latching mechanism 50. As noted earlier, the internal module 60 is slidably disposed within the first housing 58. The internal module 60 is disposed within the first housing 58 with the brace 59 disposed within the first opening 64 of the central portion 62 of the internal module 60. The first opening 64 has a shape that is conformal to the shapes of the brace 59 and the height-adjusting rod 40. The brace 59 helps to prevent excessive wobbling of the internal module 60 within the latching mechanism 50, and can act as a limiting means to prevent the internal module 60 from moving to far towards the fourth side 58R. Of particular importance as regards the design of the internal module 60 is a contact surface 60B presented by the internal surface of the first opening 64. The contact surface 60B is conformal with the surface shape of the height-adjusting rod 40, and together with the bracing surface 59B of the brace 59, is capable of pinching the height-adjusting rod 40. With the spring 90 biasing the internal module 60 forward towards the third surface 58T, the contact surface 60B is brought closer towards the bracing surface 59B. The height-adjusting rod 40 is thus pinched, or clamped, between the two surfaces 59B and 60B. In particular, the height-adjusting rod 40 is threaded. The contact surface 60B is similarly threaded. When pinched between the bracing surface 59B and the contact surface 60B, the threaded surface of the height-adjusting rod 40 mechanically engages with the threaded surface of the contact surface 60B to securely latch the height-adjusting rod 40 into position. While so latched, rotating the height-adjusting rod 40 clockwise or counter-clockwise permits fine adjustments to the distance D between the projector 20 and the feet 42. Alternatively, pressing on the button 56B against the bias of the spring 90 causes the internal module 60 to slide back towards the fourth side 58R. The contacts surface 60B is then spaced farther apart from the bracing surface 59B, and the height-adjusting rod 40 is no longer pinched between the two surfaces 59B and 60B. This permits the threaded surface of the height-adjusting rod 40 to mechanically disengage from the correspondingly threaded surface of the contact surface 60B, and so slide freely through the openings 58C and 64. Of course, the second housing 57 also has a central opening 57C through which the height-adjusting rod 40 passes. Note that only the contact surface 60B is threaded, whereas the bracing surface 59B is smooth. This is important, enabling the height-adjusting rod 40 to easily slide up and down when disengaged from the contact surface 60B (i.e., when the button 50B is pressed). Only one of the surfaces 59B, 60B should be threaded; the other should be smooth. It is thus certainly possible to make the contact surface 60B smooth and the bracing surface 59B threaded. The central portion 62 of the internal module 60 may be thought of as having two distinct positions (as measured relative to a forward point): a first position 50L in which the internal module 60 is pushed as far forward as possible towards the third side 58T so as to secure the height-adjusting rod 40 into place, and a second position 50U in which the internal module 60 is pushed towards the fourth side 58R so as to unlatch the height-adjusting rod 40 from the contact surface 60B.

The central portion 62 of the internal module 60 further comprises a first tab 66F and a second tab 66S. The first tab 66F, extending from a first side 60F of the central portion 62, is disposed within the concave cavity formed by the first surface 59F. Similarly, the second tab 66S, extending from a second side 60S of the central portion 62, is disposed within the concave cavity of the second surface 59S. The first tab 66F and the second tab 66S are of particular importance for the smooth operation of the latching mechanism 50. The first and second tabs 66F and 66S contact their respective surfaces 59F and 59S to prevent the central portion 62 from contacting the bottom surface 58B of the first housing 58. That is, the first tab 66F and the second tab 66S keep the internal module 60 raised off from the bottom surface 58B. Consequently, when the internal module 60 slides forwards or backwards, friction is induced only from the relatively smaller surface contact points between the tabs 66F and 66S and their respective surfaces 59F and 59S, and not between the central portion 62 and the bottom surface 58B. This presents considerably less friction than if the entire central portion 62 were in contact with the bottom surface 58B. The action of the latching mechanism 58 thus presents a smoother and easier action for a user. Of course, conformal surfaces on the second housing 57, which coincide with the first and second surfaces 59F and 59S to form the openings 51 and 52, also work with the first and second tabs 66F and 66S to prevent the central portion 62 of the internal module 60 from contacting the second housing 57. A third tab 66T extends from a third side 60T of the central portion 62, and is disposed within and through the concave cavity of the third surface 59T to present the button 50B. Ideally, the third tab 66T should not contact the third surface 59T, nor should the third tab 66T contact the conformal surface on the second housing 57 that forms the third opening 53. That is, the third surface 59T should not contact the third opening 53. Finally, a fourth tab 66R extends from a fourth side 60R of the central portion 62, and is disposed within a concave fourth surface 59R of the first housing 58. The spring 90 is wound around the fourth tab 66R, and so is capable of being compressed between the fourth side 60R of the central portion 62 and the fourth side 58R of the first housing 58, and thus biases the internal module 60 forward towards the third side 58T of the first housing 58.

Figure 8:
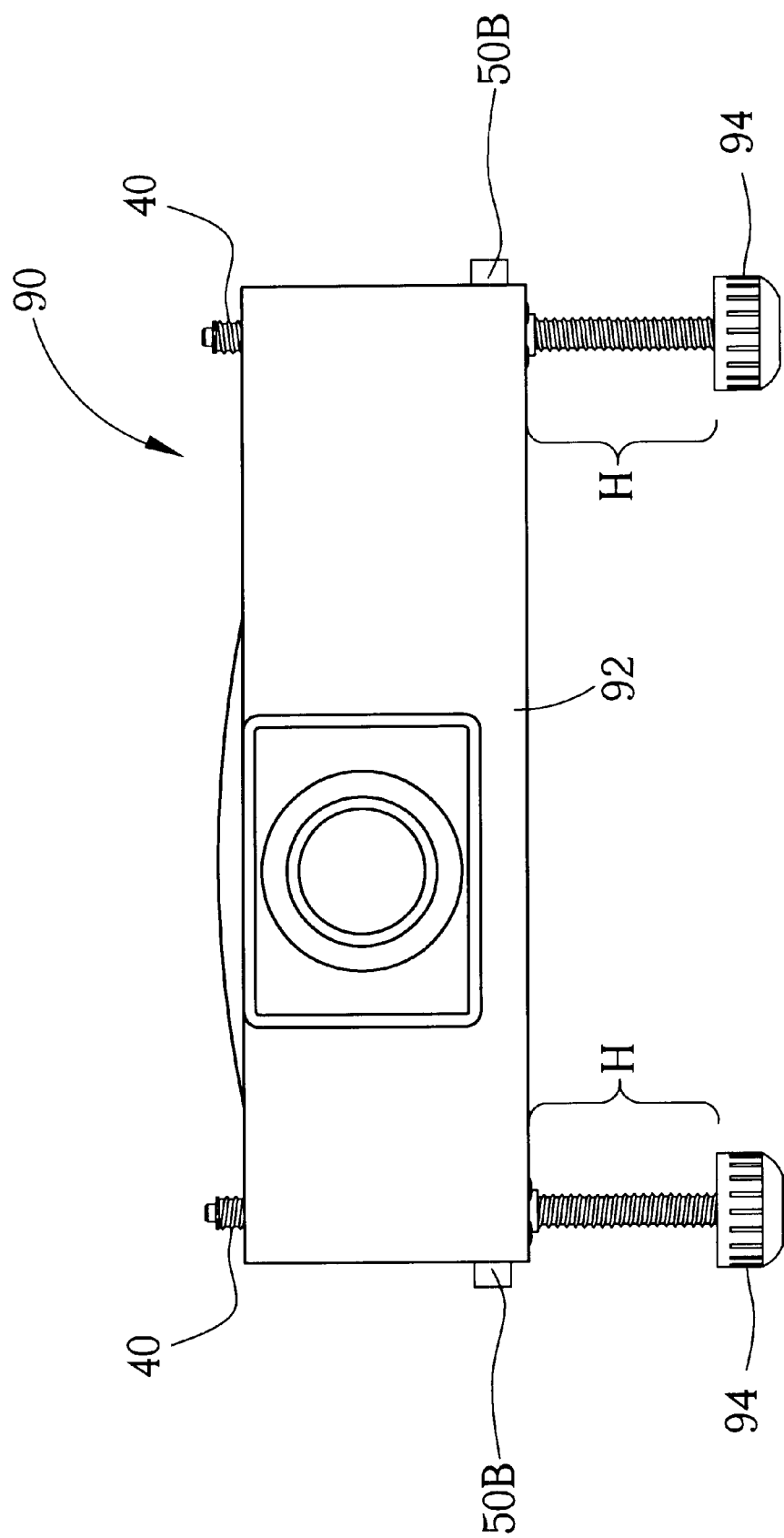
FIG. 8 is a perspective view of a projector utilizing latching mechanisms according to the present invention.

With reference to FIG. 8, it should be noted that it is not strictly necessary for the latching mechanism 50 to be mounted externally to a device. A projector 90 is built with the latching mechanisms 50 mounted within the housing 92 of the projector 90. Respective buttons 50B extend out through the housing 92 and may be depressed by a user so as to quickly adjust the extensional height H of feet 94. Note that height-adjusting rods 40 thus pass through both top and bottom surfaces of the housing 92.

In contrast to the prior art, the present invention provides a quick-release mechanism in the form of a button that a user may depress to quickly unlatch and adjust a height-adjusting rod. The latching mechanism is formed by two surfaces, one moveable and connected to the button, the other fixed to a first housing. One of the surfaces is threaded, as is the height-adjusting rod. These interacting threaded surfaces latch the height-adjusting rod into position, and enable fine adjustments of the height-adjusting rod by simply rotating the height-adjusting rod clockwise or counter-clockwise. Two support tabs (66F and 66S) are utilized to present a smooth action for the latching mechanism by keeping the central portion of the internal module from contacting the first or second housings. Quick rough adjustments to the height of a device, such as for a projection tilt angle, are possible by depressing the button to unlatch the height-adjusting rod and so allow the unlatched height-adjusting rod to move freely through the latching mechanism. Fine adjustments are possible by rotating the latched height-adjusting rod in the manner of a screw-like device.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A latching mechanism for a height-adjusting system, the latching mechanism comprising:

a first housing comprising:

a bottom surface with a central opening for accepting a height-adjusting rod;

a brace mounted on the bottom surface adjacent to the central opening, the brace having a bracing surface substantially aligned with an edge of the central opening, the bracing surface adapted to brace the height-adjusting rod;

first and second surfaces disposed on first and second sides of the first housing, respectively; and a third surface disposed on a third side of the first housing;

an internal module slidably disposed within the first housing, the internal module comprising:

a central portion having a first opening, the brace disposed within the first opening, the bracing surface of the brace facing towards a contact surface on the first opening;

first and second tabs extending from first and second sides of the central portion, respectively, the first and second tabs disposed over the first and second surfaces, respectively; and a third tab extending from a third side of the central portion, the third tab disposed over the third surface; and a second housing capable of locking onto the first housing and at least partially covering the central portion, the second housing having a central opening corresponding to the central opening of the bottom surface of the first housing;

wherein when the central portion is in a first position, the contact surface of the first opening is capable of pressing the height-adjusting rod against the bracing surface to latch the height-adjusting rod into position, and when the central portion is in a second position, the contact surface of the first opening is sufficiently spaced from the bracing surface to enable the height-adjusting rod to slide between the bracing surface and the contact surface.

2. The latching mechanism of claim 1 further comprising an elastic element for biasing the central portion towards the first position.

3. The latching mechanism of claim 2 wherein the third tab presents a button to push the central portion towards the second position and so unlatch the height-adjusting rod.

4. The latching mechanism of claim 1 wherein both the contact surface and the bracing surface are concave surfaces adapted to correspond to the height-adjusting rod, and either the bracing surface or the contact surface is a threaded surface;

wherein the threaded surface interacts with a correspondingly threaded surface on the height-adjusting rod when the central portion is in the first position to latch the height-adjusting rod into position.

5. The latching mechanism of claim 4 wherein the bracing surface is substantially smooth, and the contact surface is threaded, the bracing surface being made from nylon66.

6. The latching mechanism of claim 1 wherein the second housing further comprises first, second and third surfaces corresponding to the first, second and third surfaces of the first housing, respectively.

7. The latching mechanism of claim 6 wherein the first, second and third surfaces of both the first and second housings are concave surfaces to form first, second and third openings, respectively.

8. The latching mechanism of claim 1 wherein the bracing surface is disposed directly opposite to the contact surface.

9. The latching mechanism of claim 1 wherein mechanical interaction between the first and second tabs and the first and second surfaces prevents the central portion from contacting the bottom surface.

10. A height-adjusting system comprising:
- a height-adjusting rod for supporting a device;
- a first housing comprising:
  - a bottom surface with a central opening, the height-adjusting rod passing through the central opening;
  - a brace mounted on the bottom surface adjacent to the central opening, the brace having a bracing surface substantially aligned with an edge of the central opening, the bracing surface corresponding to the height-adjusting rod to brace the height-adjusting rod;
  - first and second surfaces disposed on first and second sides of the first housing, respectively; and
- a third surface disposed on a third side of the first housing;
- an internal module slidably disposed within the first housing, the internal module comprising:
  - a central portion having a first opening, the brace disposed within the first opening, the bracing surface of the brace facing towards a contact surface on the first opening, the height-adjusting rod disposed between the bracing surface and the contact surface;
  - first and second tabs extending from first and second sides of the central portion, respectively, the first and second tabs disposed over the first and second surfaces, respectively; and
  - a third tab extending from a third side of the central portion, the third tab disposed over the third surface; and
- a second housing capable of locking onto the first housing to at least partially cover the central portion, the second housing having a central opening corresponding to the central opening of the bottom surface of the first housing, the height-adjusting rod passing through the central opening of the second housing;

wherein when the central portion is in a first position, the contact surface of the first opening presses the height-adjusting rod against the bracing surface to latch the height-adjusting rod into position, and when the central portion is in a second position, the contact surface is sufficiently spaced from the bracing surface to enable the height-adjusting rod to slide between the bracing surface and the contact surface.

11. The height-adjusting system of claim 10 further comprising an elastic element for biasing the central portion towards the first position.

12. The height-adjusting system of claim 11 wherein the third tab presents a button to push the central portion towards the second position and so unlatch the height-adjusting rod.

13. The height-adjusting system of claim 10 wherein both the contact surface and the bracing surface are concave surfaces that correspond to the height-adjusting rod, the height-adjusting rod having a threaded surface, and either the bracing surface or the contact surface is a threaded surface, the two threaded surfaces meshing together when the central portion is in the first position to latch the height-adjusting rod into position.

14. The height-adjusting system of claim 13 wherein the bracing surface is substantially smooth, and the contact surface is threaded, the bracing surface being made from nylon66.

15. The height-adjusting system of claim 10 wherein the second housing further comprises first, second and third surfaces corresponding to the first, second and third surfaces of the first housing, respectively.

16. The height-adjusting system of claim 15 wherein the first, second and third surfaces of both the first and second housings are concave surfaces to form first, second and third openings, respectively.

17. The height-adjusting system of claim 10 wherein the bracing surface is disposed directly opposite to the contact surface.

18. The height-adjusting system of claim 10 wherein mechanical interaction between the first and second tabs and the first and second surfaces prevents the central portion from contacting the bottom surface.

* * * * *